(12) United States Patent
Neogi et al.

(10) Patent No.: US 7,300,705 B2
(45) Date of Patent: Nov. 27, 2007

(54) METHODS FOR ESTERIFYING HYDROXYL GROUPS IN WOOD

(75) Inventors: Amar N. Neogi, Kenmore, WA (US); Gary D. Peterson, Auburn, WA (US); James Shaw, Puyallup, WA (US)

(73) Assignee: Weyerhaeuser Company, Federal Way, WA (US)

( * ) Notice: Subject to any disclaimer, the term of this patent is extended or adjusted under 35 U.S.C. 154(b) by 153 days.

(21) Appl. No.: 10/602,208

(22) Filed: Jun. 23, 2003

(65) Prior Publication Data

US 2004/0258941 A1    Dec. 23, 2004

(51) Int. Cl.
*B32B 23/04*    (2006.01)
(52) U.S. Cl. ............... 428/532; 428/533; 428/534; 428/535; 428/536; 428/537.1; 427/440; 427/212; 8/121
(58) Field of Classification Search ............... 428/532, 428/533, 534, 535, 536, 537.1; 427/440, 427/212; 8/121
See application file for complete search history.

(56) References Cited

U.S. PATENT DOCUMENTS

| | | | | |
|---|---|---|---|---|
| 3,094,431 | A | * | 6/1963 | Goldstein et al. ............ 427/254 |
| 4,804,384 | A | * | 2/1989 | Rowell et al. ................. 8/121 |

FOREIGN PATENT DOCUMENTS

| | | |
|---|---|---|
| EP | 0 213 252 B1 | 3/1987 |
| JP | 19820142710 | 8/1982 |
| JP | 19880189221 | 7/1988 |
| WO | WO 01/38055 | 5/2001 |
| WO | WO 03/053105 A1 | 6/2003 |

OTHER PUBLICATIONS

"Acetylation of solid wood using microwave heating" Brelid etal.*
"Acetylation of solid wood" Beckers etal.*
"Acetylation of Wood—An Environmentally Sound Wood Modification Method," A-Cell Acetyl Cellulosics AB, 1993.
Beckers, E.P.J. and H. Militz, "Acetylation of Solid Wood: Initial Trials on Lab and Semi Industrial Scale," *Second Pacific Rim Bio-Based Composites Symposium Proceedings*, Vancouver, Canada, Nov. 6-9, 1994, pp. 125-134.
Brelid, P.L., "The Influence of Post-Treatments on Acetyl Content for Removal of Chemicals After Acetylation," *Holz als Roh und Werkstoff 60*:92-95, 2002.
Brelid, P.L., et al., "Acetylation of Solid Wood Using Microwave Heating, Part 1: Studies of Dielectric Properties," *Holz als Roh und Werkstoff 57*:259-263, 1999.
Brelid, P.L., and R. Simonson, "Acetylation of Solid Wood Using Microwave Heating, Part 2: Experiments in Laboratory Scale," *Holz als Roh und Werkstoff 57*:383-389, 1999.
Chow, P., et al., "Effects of Acetylation on the Dimensional Stability and Decay Resistance of Kenaf (*Hibiscus cannabinus* L.) Fiberboard," *The International Research Group on Wood Preservation 27th Annual Meeting*, West Indies, May 19-24, 1996, pp. 1-7.
Evans, P.D., "Weathering and Stabilisation of Wood," *ANU Forestry-Forest Product Technology*, pp. 1-4, 2000.
Feist, W.C., et al., "Weathering and Finish Performance of Acetylated Aspen Fiberboard," *Wood and Fiber Science 23*(2):260-272, 1991.
Hill, C.A.S., et al., "Kinetic and Mechanistic Aspects of the Acetylation of Wood with Acetic Anhydride," *Holzforschung 52*:623-629, 1998.
Hill, C.A.S., et al., "Potential Catalysts for the Acetylation of Wood," *Holzforschung 54*:629-272, 2000.
Ramsden, M.J., and F.S.R. Blake, "A Kinetic Study of the Acetylation of Cellulose Hemicellulose and Lignin Components in Wood," *Wood Science and Technology 31*:45-50, 1997.
Rowell, R.M., "Acetyl Balance for the Acetylation of Wood Particles by a Simplified Procedure," *Holzforshung 44*(4):263-269, 1990.
Rowell, R.M., et al., "Acetyl Distribution in Acetylated Whole Wood and Reactivity of Isolated Wood Cell-Wall Components to Acetic Anhydride," *Wood and Fiber Science 26*(1):11-18, 1994.
Takahashi, M., et al., "Effect of Acetylation on Decay Resistance of Wood Against Brown-Rot, White-Rot and Soft-Rot Fungi," *The International Research Group on Wood Preservation 20th Annual Meeting*, Lappeenranta, Finland, May 22-26, 1989, pp. 1-16.
Tillman, A.-M., et al., "Dimensional Stability and Resistance to Biological Degradation of Wood Products by a Simplified Acetylation Procedure," *Oral Presentations of the Fourth International Symposium on Wood and Pulping Chemistry*, Paris, Apr. 27-30, 1987, pp. 125-129.

* cited by examiner

*Primary Examiner*—Leszek Kiliman
(74) *Attorney, Agent, or Firm*—Christensen O'Connor Johnson Kindness

(57) ABSTRACT

Methods for esterifying hydroxyl groups in cellulose, hemicellulose, and lignin in wood are described, wherein the wood is chosen from loblolly, slash, shortleaf, longleaf or radiata pines. Methods can include solvent drying techniques and heating provided by electromagnetic radiation, such as microwave, and radiofrequency. Products made from the methods are described that have greater decay resistance and dimensional stability as compared with non-esterified wood products.

17 Claims, 1 Drawing Sheet

METHODS FOR ESTERIFYING HYDROXYL GROUPS IN WOOD

FIELD OF THE INVENTION

The field of the invention relates to the esterification of hydroxyl groups in wood, more specifically, the wood from Southern and radiata pine species.

BACKGROUND OF THE INVENTION

Esterification of the hydroxyl groups in the cellulose, hemicellulose, and lignin in wood provides lumber produced therefrom with improved dimensional stability, as well as resistance to attack from biological organisms. Acetylation is one method for esterifying the components of wood. For brevity herein, this process will be referred to as acetylation of wood.

One method for acetylating wood reacts acetic anhydride with hydroxyl groups in the wood to provide ester groups through a substitution reaction. Since acetic anhydride can also react with water present in wood to produce acetic acid, the wood is typically dried prior to acetylation. Conventional methods of drying wood include kiln drying with steam. Kiln drying can degrade the wood by causing warping, checking, and splitting, and requires a significant time to reach the desired moisture level.

After kiln drying, the wood is transported from the kiln to a reaction vessel. While in transit, the wood may absorb additional moisture. Dried wood is next impregnated with acetic anhydride, and heat is applied to initiate the exothermic acetylation reaction between the hydroxyl groups and the acetyl groups. Uniform temperature control is desirable to provide evenly distributed ester groups throughout the wood. Convective heating is one option for heating the wood but suffers from the disadvantage of taking a long period of time to heat the wood through convection to the desired temperature. Another technique for applying heat during the acetylation reaction is with the use of microwave radiation.

Conventional acetylation methods have typically employed small wood pieces. Larger wood pieces are more limited in their ability to become impregnated with and be stripped of chemicals. Therefore, it is difficult or commercially unfeasible to produce solid lumber products made from whole acetylated wood because even or uniform acetylation cannot be achieved.

While some improvements have occurred in acetylation, there still remains a need to provide methods that increase the efficiency and reduce labor and costs associated with the acetylation of wood with acetic anhydride.

The present invention fulfills this need and has further related advantages as specified below.

SUMMARY OF THE INVENTION

One embodiment according to the invention is a method for esterifying wood. Esterification of wood refers to acylation of any of the hydroxyl groups present in cellulose, hemicellulose, and lignin in wood to provide ester moieties. Esterified wood refers to wood having ester groups in excess of those occurring naturally. Acetylation refers to the acylation of the hydroxyl groups with an acetyl group. The process of esterification begins with drying the wood. Moisture can be removed from the wood using electromagnetic radiation or by a solvent, such as acetic acid. When solvent is used, the solvent is allowed to penetrate the wood where it dissolves the water, and the moisture is removed by evaporation with the solvent at reduced pressures. The very low-moisture wood is then impregnated with an alkanoic anhydride, such as acetic anhydride. The impregnated wood is then heated with electromagnetic radiation, such as microwave or radio frequency, to produce esterified wood having a degree of esterification from about 10% to about 25%. The esterified wood can then be stripped of unreacted alkanoic anhydride, reaction by-products, and any solvent.

In another embodiment of the method, loblolly, slash, longleaf, shortleaf, or radiata pine wood having less than about 8% water by weight is impregnated with an alkanoic anhydride, such as acetic anhydride, for a time ranging from about 15 to about 30 minutes. The impregnated wood is heated to produce esterified wood having a degree of esterification ranging anywhere from about 15% to about 22%. The alkanoic anhydride and the alkanoic acid, such as acetic acid, are then removed from the esterified wood in less than about 120 minutes to achieve esterified wood having less than 1% by weight of residual alkanoic anhydride and alkanoic acid.

In another embodiment of the present invention, esterified wood products are provided. The wood products can be made from Southern species of pine, including loblolly, longleaf, shortleaf, and slash, or radiata pine.

The methods according to the invention have the advantage of being carried out without having to remove the wood from the vessel that is used to dry the wood. Using solvent drying of the wood provides a more economical method of esterifying wood.

Esterified wood products made according to the invention have greater durability and dimensional stability as compared with the non-esterified wood products from nondurable species.

BRIEF DESCRIPTION OF THE DRAWING

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
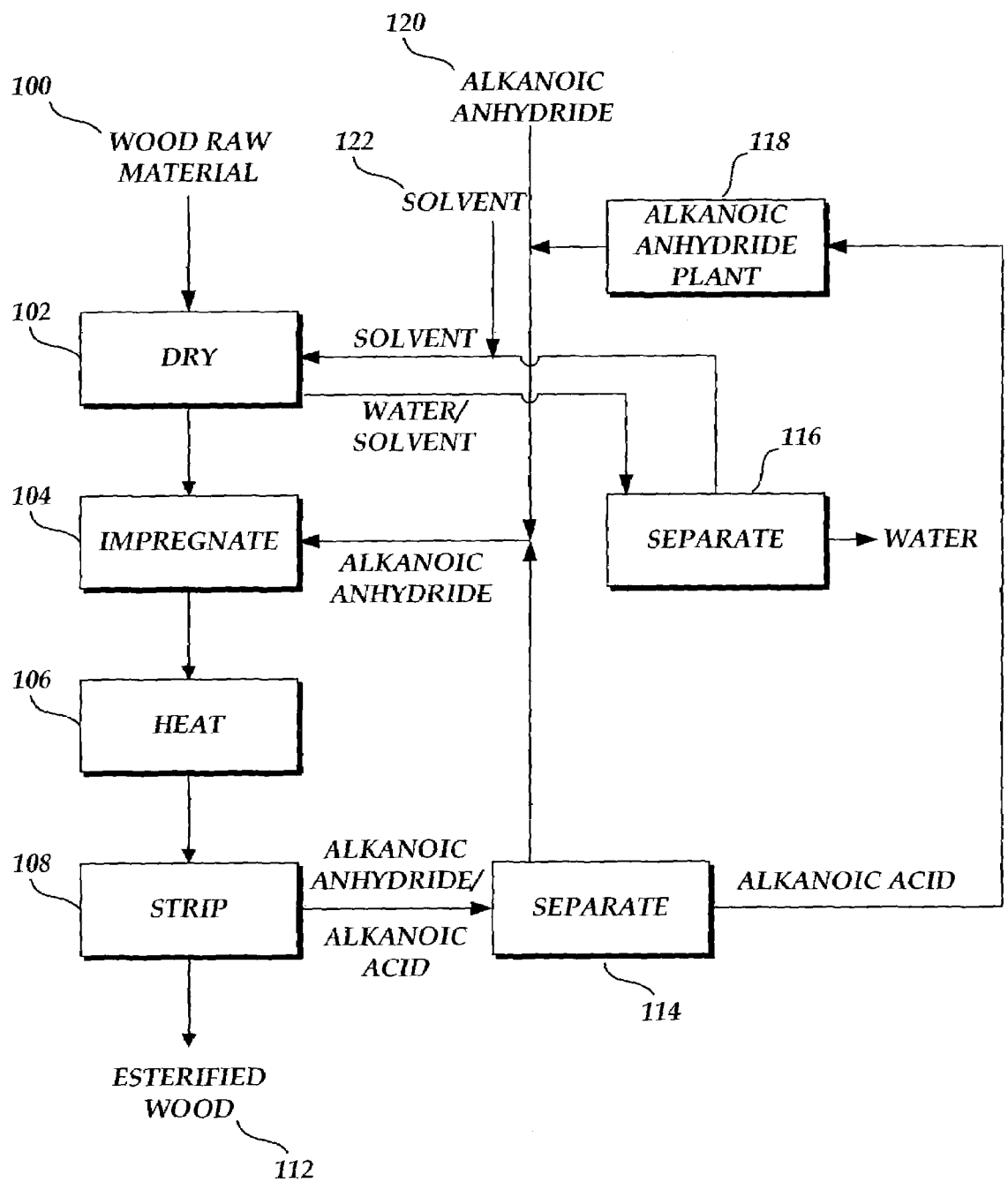
FIG. 1 is a schematic flowsheet illustrating one embodiment of a method according to the invention.

Referring to the FIGURE, a representative method of esterification includes a drying step, represented by block 102, an impregnating step, represented by block 104, a heating step, represented by block 106, and a stripping step, represented by block 108. Esterification refers to the process of converting the hydroxyl groups to an ester group on at least some of the cellulose, hemicellulose, and lignin molecules found in wood. The esterified wood contains compounds represented by the following simplified chemical formula, wherein R can be any cellulose, hemicellulose, or lignin molecule. It is to be appreciated that more than one ester moiety can be provided on a cellulose, hemicellulose, or lignin molecule.

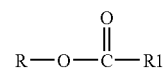

The moieties R1 have from 1 to 5 carbon atoms. One representative R1 moiety is a methyl group. Moieties R1 may be saturated, unsaturated, substituted, unsubstituted, linear, and branched groups. One representative method for providing ester groups in wood is through acylation of the hydroxyl groups in wood. A representative acyl group is an acetyl group. Acyl groups can be provided by symmetrical monocarboxylic acid anhydrides (alkanoic anhydrides), such as acetic anhydride. Acetylation is a preferred form of esterification for the present invention, wherein the hydrogen atoms of the hydroxyl groups in wood are substituted for acetyl groups. The acylation of hydroxyl groups with a monocarboxylic acid anhydride is represented below.

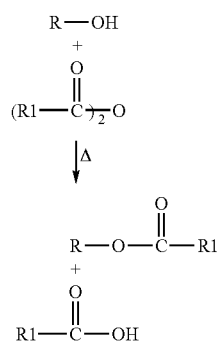

The apparatus required to perform the esterification method according to the invention includes a reaction vessel. The reaction vessel can be used to treat wood in the drying step, block 102; the impregnating step, block 104; the heating step, block 106; and the stripping step, block 108. In one embodiment of the method, the reaction vessel can be a horizontal vessel. The reaction vessel can be designed to accommodate electromagnetic radiation, such as microwave or radiofrequency radiation within the vessel. The radiofrequency radiation can have a frequency ranging anywhere from about 6 MHz to about 915 MHz. Microwave radiation can have a frequency ranging anywhere from about 916 MHz to about 2,450 MHz.

The starting material is raw wood of a specific nature that allows solvents, such as acetic acid, and alkanoic anhydrides, such as acetic anhydride, to be readily impregnated into and stripped from the wood. Suitable woods can include Southern pine wood species, including loblolly pine (*Pinus taeda*), shortleaf pine (*Pinus echinata*), longleaf pine (*Pinus palustris*), and slash pine (*Pinus elliottii*). Radiata pine (*Pinus radiata*) is also suitable.

Referring again to the FIGURE, the wood members coming from source 100 are loaded into the vessel. If the appearance of the end use product is important, the wood should not be exposed to the ambient environment for a prolonged period, which may lead to a visually unappealing product. The wood members may be stacked inside the vessel in a convenient manner to allow for the free movement of liquid between the individual wood members and full penetration of the electromagnetic radiation into the wood. Using the lower frequencies allows larger stacks of wood with minimal spacing, while at the higher frequencies, stack sizes are by necessity comparatively smaller. Using higher frequencies may require increased spacing or generators interposed between the wood members. Depending on the species of wood and electromagnetic frequency used, the dimensions of the wood members can vary. One embodiment of the method according to the invention uses loblolly pine. Because the time required to impregnate loblolly pine with solvent and the time required to strip loblolly pine of chemicals are relatively faster than for most other woods, the wood members made from loblolly pine can be thicker, relative to the other woods, to achieve the same amount of impregnation in the same amount of time.

It is typical for the wood members coming from source 100 to have a moisture content ranging from about 15% to about 20% by weight. The level of moisture in the wood can be reduced before esterification to about less than 8% by weight using the conventional kiln drying techniques. However, by using a solvent drying technique according to the invention, the moisture can be reduced to less than about 1% by weight. The lower moisture content can reduce the amount of alkanoic anhydride that is used up during the heating step, block 106. However, the alkanoic anhydride, such as acetic anhydride, should contain some alkanoic acid, such as acetic acid if the wood contains less than 1% moisture. For example, 4% acetic acid can be included with the acetic anhydride.

In the drying step, represented by block 102, drying of the wood can take place by differing methods. For example, solvent drying with or without reduced pressure, kiln drying, and electromagnetic radiation drying with or without reduced pressure, can be used. In solvent drying, the wood from source 100 can be combined with a solvent. In one embodiment of the invention, the solvent includes an alkanoic acid, such as acetic acid. Acetic acid can be used when the reactant is acetic anhydride, since acetic acid is also a by-product of the reaction between the hydroxyl groups in wood and acetic anhydride. Another advantage of using acetic acid is that the wood can be dried to a much lower moisture content as compared with using steam-heated kilns. A reduction of a substantial amount of moisture, such as less than about 1%, will reduce the degree of degradation to the wood. The same moisture level brought about through methods other than solvent drying, such as kiln drying, results in degradation of the wood. It is believed that acetic acid keeps the wood in a swollen condition, such that shrinkage, cracking, and warping are minimized.

Alternative solvents to acetic acid can include other carboxylic acids, ketones, or ethers, or a variety of these solvents can be combined.

The time required for solvent drying is minimized when the wood is loblolly, slash, longleaf, shortleaf, or radiata pine. These types of wood possess the ability to quickly become impregnated with, and can quickly be stripped of, solvents, alkanoic anhydrides and alkanoic acids (resulting when the anhydride is hydrolyzed), that can produce an overall processing period from drying to stripping that is minimized. For example, plantation-grown loblolly pine of about 28 to about 36 years old, has the ability to be both quickly impregnated with and stripped of the chemicals much faster than other species of trees, such as hemlock or Douglas fir.

Referring once again to the FIGURE, the drying cycle, block 102, includes loading the wood into the vessel, followed by removing air by applying vacuum. Thereafter, the solvent can be loaded in the vessel after applying vacuum to fully immerse the wood members with solvent. Once filled with solvent, pressure is applied to impregnate the solvent into the wood. For example, the vacuum portion of the dry cycle can be as low as about 0.01 bar for about 5 to 10 minutes. The pressure portion of the dry cycle can be as high as about 12 bar for about 5 to 10 minutes. Before, during, or after the pressure is reduced to about atmospheric pressure at the end of the last cycle, the solvent can be drained from the vessel. After draining, some solvent and moisture remain within the wood. The degree of solvent uptake can cause a weight gain in the wood ranging from at least about 100% to about 150%. The wood can then be subjected to a further procedure whereby heat is applied under vacuum to remove the water as an azeotropic vapor mixture of water and solvent. The temperature of the wood should not be allowed to go above about 160° C. Heating the wood members with microwave or radiofrequency radiation under vacuum can remove solvent and water to produce a moisture content in wood as low as about 2% by weight to about 1% by weight, or even lower. After the heating and vacuum process, the wood can still retain about 15% by weight of solvent. No appreciable warping occurs in the wood because of the presence of the solvent. One advantage to reducing the moisture content to be about zero, such as less than about 1% by weight, is that the alkanoic anhydride, such as acetic anhydride, can react with the hydroxyl groups in wood as opposed to the water molecules that would be present in the wood if the moisture content were higher. Furthermore, when using a solvent drying method in combination with an esterification process, the wood to be esterified can remain in the same vessel that is used for drying as well as in the subsequent esterification procedure. Any residual solvent can improve the reactivity of the wood with the alkanoic anhydride.

Referring once again to the FIGURE, the removed water and solvent can be directed to a solvent recovery operation, represented by block 116, wherein the water can further be separated from the solvent. The recovery operation may include modification of the apparatus to include a plurality of vessels. At least one vessel can be used to contain the solvent and water removed in the dry step, block 102, and a separate vessel can be used to contain the unreacted alkanoic anhydride, alkanoic acid, and solvent removed in the stripping step, block 108. A diverter valve can be located on a line from the vessel containing the wood members, so that any removed vapors and liquids can be diverted to the proper vessel during the appropriate step. It is also to be appreciated that the vessel wherein the wood members are treated is connected to vacuum and pressure systems and the ancillary equipment needed to carry out these operations. Furthermore, after the solvent and water vapors are condensed into a liquid in the dry step, block 102, the solvent can be distilled or otherwise purified into substantially pure solvent that can then be recycled to the reaction vessel to be used again in the dry step, block 102. The separated water from the separation step, block 116, can be discarded.

As a suitable alternative to solvent drying, the wood can be dried using a steam or electrically traced kiln in the dry step, block 102. Kiln drying requires about seven days to lower the moisture level of wood in the range of about 3% to about 5% that would be suitable for esterification. However, kiln drying causes a greater moisture gradient in the wood as compared to solvent drying, that can lead to warping. Kiln drying also means that esterification cannot take place in the kiln; therefore, the wood needs to be transported from the kiln to the reaction vessel. The dried wood leaving the kiln will tend to absorb moisture from the atmosphere and there is a possibility of additional warping between the drying and heating steps. Therefore, the period the wood is exposed to the atmosphere between drying and impregnation should be minimized.

Another alternative method of drying the wood would be to apply heat under vacuum without using a solvent, wherein the heat is generated using microwave or radiofrequency radiation. In this embodiment, the same vessel that is used to carry out the drying step can also be used to carry out the heating step that causes the esterification of the hydroxyl groups.

The alternative methods to a solvent drying technique might be capable of reducing the moisture content to as low as about 5% to about 8% by weight, before degenerative effects occur in the wood. Generally, the higher the moisture content in wood, the greater the consumption of alkanoic anhydride, due to the reaction between alkanoic anhydride and water. Under some circumstances, however, this may be desirable. For example, one of the advantages of using electromagnetic radiation, such as microwave or radiofrequency to dry the wood, is to conserve energy. The heat contained in the wood after drying with electromagnetic radiation will mean less energy used in later steps. The dry step, block 102, is considered completed after reaching the desired moisture content in the wood and the wood is ready to receive an alkanoic anhydride.

Referring once again to the FIGURE, alkanoic anhydride, such as acetic anhydride, is loaded into the reaction vessel in the impregnate step, block 104. However, before filling the vessel with alkanoic anhydride, the air is removed from the vessel by applying a vacuum. Acetic anhydride is one representative alkanoic anhydride that can be used in the method according to the invention. Generally, any symmetrical monocarboxylic acid anhydride can be used, wherein the monocarboxylic acid has no more than 5 carbon atoms, not including the carbon forming the carboxyl group. To achieve uniform esterification of solid wood, the wood should be thoroughly impregnated with alkanoic anhydride. Impregnation of the wood with alkanoic anhydride can occur by providing one or more cycles of vacuum followed by pressure once the vessel is filled with alkanoic anhydride. For example, during one cycle, a vacuum can be applied to lower the pressure to about 0.1 bar. The vessel can remain under vacuum ranging anywhere from about 5 minutes to about 10 minutes, depending on the wood species. The pressure portion of the cycle can include pressurizing the vessel to as high as about 2 bar, ranging anywhere from about 5 to about 10 minutes, again depending on the wood species. The alkanoic anhydride penetrates into the wood and can increase the weight of the wood by as much as about 100% to about 150%.

The time required for impregnating the wood with alkanoic anhydride can be minimized by selecting a wood from a Southern pine species, including loblolly, slash, longleaf, shortleaf, or radiata pine. For example, with loblolly pine, the time required for impregnation with acetic anhydride may be made to occur within about 15 to about 30 minutes. Impregnation using different Southern or radiata pine wood impregnated with different alkanoic anhydrides can also be achieved within about 15 to about 30 minutes. The impregnation time begins at the first instance when alkanoic anhydride is introduced into the vessel. The impregnation time ends at the first instance of draining the alkanoic anhydride from the vessel.

Referring once again to the FIGURE, in block 106, heating the impregnated wood initiates the acylation reaction between the hydroxyl groups on cellulose, hemicellulose, and lignin with the acyl groups provided by the alkanoic anhydride. In some embodiments, either microwave or radiofrequency radiation can be used to heat the wood. Radiofrequency radiation is electromagnetic radiation having a frequency of about 6 MHz to about 915 MHz and microwave radiation is electromagnetic radiation having a frequency of about 916 MHz to about 2450 MHz. The power can be adjusted to meet the temperature requirements for the amount of wood in the vessel. Strategically placed temperature probes inside the vessel can be located within selected wood members to monitor the wood temperatures during any of the steps where heat is applied. The wood temperature can be uniformly controlled to produce a temperature gradient in the wood and can result in more evenly distributed ester groups throughout the wood with the use of microwave or radiofrequency radiation as compared with heating by a steam-jacketed vessel. However, it is beneficial to heat the reaction chamber during the electromagnetic heating of the wood to minimize condensation inside the chamber. Radiofrequency or microwave heating is not necessary for the entire duration of the heating step, block 106. The acylation reaction that produces esters is an exothermic reaction. The heat generated by the acylation reaction can provide sufficient heat whereby the power can be cycled on and off to maintain the wood temperature within the desired range rather than being applied in a continuous manner. In one embodiment of the process, once the desired temperature is reached, the reaction is allowed to proceed at that temperature for about one hour. The wood temperature should not be allowed to go above 160° C., which may result in overheating of the wood leading to darkening or degradation of the wood. A suitable wood temperature range is about 120° to about 130° C. The heat step, block 106, is carried out for a length of time sufficient to produce a degree of esterification ranging anywhere from about 10% to about 25%, or ranging anywhere from about 15% to about 22%. The degree of esterification is approximated by the weight gain realized by the wood. The moisture content of the wood prior to esterification, from which the oven-dried weight of the wood prior to esterification can be calculated, is obtained by ASTM D4442. The weight gain is therefore the oven-dry weight subtracted from the final weight of the wood after stripping, the result being divided by the oven-dry weight and the result expressed as a percent.

Referring once again to the FIGURE, the stripping step, block 108, follows the heating step, block 106. In the stripping step, the unreacted alkanoic anhydride, any by-products of reaction, such as alkanoic acid, and solvent, are removed, first, by draining from the vessel, and then by heating under vacuum. If the alkanoic anhydride used is acetic anhydride, a reaction by-product includes acetic acid. The solvent can also be acetic acid, and therefore the acetic acid first introduced as solvent and the acetic acid generated through the acylation reaction may be indistinguishable. The unreacted alkanoic anhydride and alkanoic acid can be drained to the appropriate vessel described above in association with the drying step, block 102.

In the strip step, block 108, stripping the wood of chemicals can take place by applying vacuum. The wood temperature will decrease as a result of evaporation of the chemicals being stripped. The wood temperature can be controlled throughout the stripping step by the intermittent use of electromagnetic radiation. According to the invention, the removal time to strip esterified wood of chemicals can be reduced when the esterified wood is loblolly, slash, longleaf, shortleaf, or radiata pine. Removal time as used herein means the time to achieve a percent of residual alkanoic anhydride and alkanoic acid remaining in the esterified wood within a set time limit. Removal time begins with the initial application of vacuum on the vessel during the stripping step. Removal time is considered to end when the wood contains less than about 1% by weight of residual alkanoic anhydride and alkanoic acid. The residual percent is approximated by placing a sample of esterified wood of known weight in an oven, monitoring the weight during heating, and determining when the weight no longer decreases. The difference in weight is an approximation of the residual percent of alkanoic anhydride and alkanoic acid. Choosing from among the woods according to the present invention can result in a removal time that can take less than about 120 minutes. After completing the stripping step, block 108, the pressure may be returned to ambient, and the wood is removed from the vessel where it will come to ambient temperature.

In other embodiments of the method according to the invention, other operations can be incorporated to further provide for the separation of the alkanoic anhydride from the alkanoic acid, and solvent, which is removed in the stripping step, block 108. Distillation, or other well known processes for separating an alkanoic anhydride, such as acetic anhydride, from an alkanoic acid, such as acetic acid, and/or solvent, can be used in the separation step, block 114. The alkanoic anhydride produced in the separation step, block 114, may be of suitable purity to be recycled as reactant into the impregnate step, block 104. Any makeup alkanoic anhydride can be provided from a fresh supply of alkanoic anhydride, such as from source 120. Any alkanoic acid recovered in the separation step, block 114, can be transferred to the alkanoic anhydride plant, block 118, to be converted into alkanoic anhydride for use also in the impregnate step, block 104.

A further operation described above in connection with the drying step, block 102, is shown in the FIGURE as a separate step, block 116. In the operation of this step, any suitable process for separating solvent from water that is removed in the drying step, block 102, can be provided. Fresh solvent coming from source 122, can be added to make up any deficiencies of the recycled solvent. If the solvent and the alkanoic acid both happen to be the same, such as with acetic acid, some or all of the solvent from the separation step, block 116, can be routed to the alkanoic anhydride plant, block 118. In the case of acetic acid, the acetic acid can be converted into ketene, which can then be reacted with acetic acid to produce acetic anhydride. The acetic anhydride thus produced can then be used in the impregnate step, block 104.

Esterified wood 112 made by the process according to the invention can be used in various products that can withstand being exposed to the ambient atmospheric conditions longer without experiencing dimensional instability as compared to the non-esterified wood products. Dimensional stability can be measured in terms of dimensional change coefficients. The dimensional stability of the wood processed by the method of the invention is improved. Wood used in the products according to the invention is harvested from Southern pine, including shortleaf, longleaf, slash, and loblolly pine, or radiata pine, which is not a Southern pine. In one embodiment, loblolly pine is used that is grown on a plantation and the wood is of 28 to 36 years of age.

Dimensionally stabilized lumber products can be produced according to the method of the invention. Dimensional lumber, siding and exterior decking are representative examples of wood products that can be produced according to the method of the invention. Siding is any wood member, so dimensioned to be used as the outermost component of a structure or building and that is exposed to the ambient atmosphere during its intended use. Siding products comprising esterified wood made according to the invention can be painted or otherwise finished.

A further use for esterified wood made from the process of the invention is for building any outdoor deck from lumber or radius-edge decking, wherein the lumber has been esterified according to the invention. The advantages of using esterified wood over the presently used copper chromium arsenic treated wood (CCA) is that esterified wood is not prone to leaching and does not contaminate soil or groundwater.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for esterifying a commercial amount of wood, comprising:
    (a) removing moisture from the wood with a solvent or electromagnetic radiation to produce dried wood having less than about 8% water by weight;
    (b) impregnating said dried wood with alkanoic anhydride; and
    (c) heating impregnated wood in a frequency range of about 6 MHz to about 30 MHz to produce esterified wood having a degree of esterification from about 10% to about 25%.

2. The method of claim 1, wherein the solvent is a carboxylic acid, a ketone, or an ether.

3. The method of claim 1, wherein the solvent is acetic acid and the alkanoic anhydride is acetic anhydride.

4. The method of claim 1, further comprising heating said esterified wood under vacuum to remove said alkanoic anhydride, alkanoic acid, and solvent.

5. The method of claim 4, further comprising separating said alkanoic anhydride from alkanoic acid and solvent.

6. The method of claim 5, further comprising converting alkanoic acid into alkanoic anhydride.

7. The method of claim 5, further comprising recycling said separated alkanoic anhydride to be used for impregnating wood in step (b).

8. The method of claim 1, further comprising separating and recycling said solvent to be used for removing moisture in step (a).

9. The method of claim 1, wherein step (a) comprises removing an azeotropic mixture of solvent and water.

10. The method of claim 1, wherein the steps (a), (b), and (c) are performed with the wood remaining within the same vessel.

11. The method of claim 1, further comprising heating said esterified wood under vacuum to remove alkanoic anhydride and alkanoic acid.

12. The method of claim 1, wherein moisture is removed from wood with a solvent.

13. The method of claim 1, further comprising adding alkanoic acid during impregnation of the wood.

14. The method of claim 1, wherein the dried wood comprises less than about 6% water by weight.

15. The method of claim 1, wherein the wood is loblolly, slash, longleaf, shortleaf, or radiata pine.

16. A method for esterifying a commercial amount of wood, comprising:
    (a) impregnating loblolly, slash, longleaf, shortleaf or radiata pine wood having less than about 8% water by weight with alkanoic anhydride, wherein the impregnation time is about 15 to about 30 minutes;
    (b) heating impregnated wood in a frequency range of about 6 MHz to about 30 MHz to produce esterified wood having a degree of esterification of about 15% to about 22%; and
    (c) removing alkanoic anhydride and alkanoic acid from said esterified wood, wherein the removal time is less than about 120 minutes to achieve esterified wood having less than about 1% combined alkanoic anhydride and alkanoic acid.

17. A dimensionally stabilized lumber product, comprising: esterified wood made from a commercial amount of loblolly, slash, longleaf shortleaf, or radiata pine, wherein said wood is esterified by the process comprising:
    (a) impregnating loblolly, slash, longleaf, shortleaf or radiata pine wood having less than about 8% water by weight with alkanoic anhydride, wherein the impregnation time is about 15 to about 30 minutes;
    (b) heating impregnated wood in a frequency range of about 6 MHz to about 30 MHz to produce esterified wood having a degree of esterification of about 15% to about 22%; and
    (c) removing alkanoic anhydride and alkanoic acid from said esterified wood, wherein the removal time is less than about 120 minutes to achieve esterified wood having less than about 1% combined alkanoic anhydride and alkanoic acid.

* * * * *